United States Patent
Nakano

[11] Patent Number: 5,902,208
[45] Date of Patent: May 11, 1999

[54] DUAL CAVITY TOROIDAL TYPE CONTINUOUSLY VARIABLE TRANSMISSION

[75] Inventor: Masaki Nakano, Yokohama, Japan

[73] Assignee: Nissan Motor Co., Ltd., Yokohama, Japan

[21] Appl. No.: 08/861,622

[22] Filed: May 22, 1997

[30] Foreign Application Priority Data

May 23, 1996 [JP] Japan ................................... 8-128247

[51] Int. Cl.$^6$ ............................. F16H 15/38; F16H 57/02
[52] U.S. Cl. ........................... 476/42; 74/606 R; 475/216
[58] Field of Search ........................ 74/606 R; 475/216; 476/42

[56] References Cited

U.S. PATENT DOCUMENTS

| | | | |
|---|---|---|---|
| 4,968,289 | 11/1990 | Nakano | 475/185 |
| 5,230,258 | 7/1993 | Nakano | 74/606 R |

FOREIGN PATENT DOCUMENTS

| | | |
|---|---|---|
| 4-69439 | 3/1992 | Japan . |
| 5-39834 | 2/1993 | Japan . |
| 7-158712 | 6/1995 | Japan . |

*Primary Examiner*—Allan D. Herrmann
*Attorney, Agent, or Firm*—Foley & Lardner

[57] ABSTRACT

In a dual cavity toroidal type continuously variable transmission comprises, inward projections integral with a transmission case are positioned between two output discs and formed with threaded bolt holes directed toward an open end of the transmission case. An output gear housing is coaxially installed in the transmission case and secured to the inward projections by means of bolts which are screwed into the threaded bolt holes. The threaded bolt holes are arranged on a first imaginary circle which is coaxial with a second imaginary circle described by an outer periphery of the output discs. The first imaginary circle is greater than the second imaginary circle in diameter. Splines formed on an inner wall of the transmission case for carrying driven plates of a backward brake of a forward/backward switching mechanism are so arranged and constructed that tops of ridges of the splilnes are arranged on a third imaginary circle which is coaxial with the first imaginary circle and smaller than the same in diameter. Any splines which would overlap with the threaded bolt holes when viewed from the open end of the transmission case are not provided.

3 Claims, 5 Drawing Sheets

DUAL CAVITY TOROIDAL TYPE CONTINUOUSLY VARIABLE TRANSMISSION

BACKGROUND OF THE INVENTION

1. Field of the Invention

The present invention relates in general to a toroidal type continuously variable transmission, and more particularly to a dual cavity toroidal type continuously variable transmission which includes a couple of toroidal type speed change units.

2. Description of the Prior Art

A toroidal type continuously variable transmission is a transmission using a toroidal type speed change unit as an essential element. The rotoidal type speed change unit comprises aligned input and output cone discs and power (or friction) rollers each being put between the input and output discs establishing a frictional engagement therewith. When a larger torque transmission is needed, a dual type unit including two toroidal type speed change units is commonly used such as one disclosed in Japanese Patent First Provisional Publication 4-69439. Usually, the transmission having such dual type unit is called a dual cavity toroidal type continuously variable transmission.

That is, in the dual type unit of the publication, two, that is, front and rear, toroidal type speed change units are coaxially arranged in a transmission case along a main shaft with their respective output discs arranged back-to-back with each other. The output discs are connected to rotate together about the main shaft. Respective input discs of the units are connected to the main shaft to rotate therewith. With a torque applied to the input disc of the front speed change unit, two input discs of the two speed change units are rotated together. A loading cam device is arranged about the main shaft in front of the front toroidal type speed change unit. With a thrust applied by the loading cam device to the input disc of the front speed change unit in accordance with a transmitted torque, the input discs of the two speed change units are biased toward the corresponding output discs. With this biasing force, power rollers of each speed change unit is compressed between the input and output discs with a force corresponding to the biasing force to assure power transmission from the input disc to the output disc. That is, power applied to each input disc is transmitted to the corresponding power rollers and then to the corresponding output disc. When, during this power transmission, the inclination angle of each power roller of each speed change unit is continuously changed relative to a rotation axis of the corresponding input and output discs, speed change is continuously carried out between the input and output discs. During this, the thrust applied to the respective input discs by the loading cam device biases the power rollers against the output discs.

In a dual cavity toroidal type continuously variable transmission including the two toroidal type speed change units, it is common to rotatably support the main shaft at the position between the respective output discs of the speed change units. For this supporting, there is provided in the transmission case a gear housing (or intermediate wall member) through which the main shaft passes in a manner to be rotatably supported thereby. To install the gear housing in the transmission case, the same is led into the case from a front open end of the transmission case and secured to a given portion of the case by bolts.

One arrangement for the gear housing in a transmission case is shown in Japanese Patent First Provisional Publication 5-39834. In this arrangement, an imaginary circle on which bolt holes for the bolts are arranged is positioned radially inside of an outer periphery of each output disc with respect to the main shaft. For this arrangement, it is inevitably necessary to take such assembling steps that at first, the gear housing is led into the transmission case and bolted to the given portion of the case and then the two output discs and associated parts are assembled to the gear housing. However, these assembling steps are troublesome and thus result in a greater assembly time. Furthermore, in the arrangement of the publication, it is somewhat difficult to obtain a precisely synchronized operation of the power rollers between the front and rear toroidal type speed change units. In fact, in such arrangement, it is difficult to provide around the gear housing with a suitable space through which an upper link bridging member needed for the synchronized operation passes.

In view of the above, the applicant has proposed a measure which is disclosed in Japanese Patent First Provisional Publication 7-158712 in which an imaginary circle on which the bolt holes are arranged is positioned radially outside of the outer periphery of each output disc. In this transmission, before inserting a gear housing into the transmission case, almost all parts to be mounted to the gear housing are preassembled to the gear housing and then the impregnated gear housing is bolted to the given portion of the transmission case. These assembling steps are simple. Furthermore, the arrangement of this publication can easily provide around the gear housing a certain space through which the upper link bridging member can pass.

As is known, the dual cavity toroidal type continuously variable transmission has, in addition to the above-mentioned two speed change units, a so-called forward/backward switching mechanism which is arranged at a front of the speed change units to transmit the rotation of an input shaft to the input discs while keeping or changing the direction of rotation.

The forward/backward switching mechanism comprises a planetary gear unit. Under power transmission in a normal direction, two rotatable members of the planetary gear unit are coupled by a forward clutch to permit the unit to assume a normally-coupled state. While, under power transmission in a reversed direction, one of the rotatable members is fixed to the transmission case by a backward brake to permit the unit to assume a reversely-coupled state.

In the forward/backward switching mechanism having the above-mentioned arrangement, driven plates of the backward brake are axially movably held by splines formed on an inner wall of the front open end of the transmission case. However, in order to permit insertion of the preassembled gear housing into the transmission case from the front open end, the splined portion of the inner wall has such a construction and size that tops of ridges of the splines are positioned radially outside of the above-mentioned imaginary circle. However, as is easily known, this arrangement tends to induce a bulky construction of the front open end of the transmission case, and thus, that of the transmission case.

SUMMARY OF THE INVENTION

It is therefore an object of the present invention to provide a dual cavity toroidal type continuously variable transmission which is free of the above-mentioned drawbacks.

According to the present invention, there is provided a dual cavity toroidal type continuously variable transmission wherein a preassembled gear housing can be inserted into a transmission case and bolted to a given portion of the case without need of enlarging the front open end of the transmission case.

According to the present invention, there is provided a dual cavity toroidal type continuously variable transmission which comprises a transmission case having an open end; front and rear toroidal type speed change units coaxially installed in the transmission case with respective output discs arranged back-to-back with each other; a forward/backward switching mechanism installed in the transmission case near the open end, the switching mechanism including a brake including driven plates which are axially movable along splines formed on an inner wall of the transmission case; a loading cam device operatively arranged between the forward/backward switching mechanism and an input disc of the front toroidal type speed change unit to transmit torque from the switching mechanism to the input discs of the front and rear speed change units while biasing each input disc toward the corresponding output disc; inward projections integral with the transmission case, the inward projections being positioned between the two output discs and formed with threaded bolt holes directed toward the open end; and a gear housing coaxially installed in the transmission case and secured to the inward projections by means of bolts screwed into the threaded bolt holes; wherein the threaded bolt holes are arranged on a first imaginary circle which is coaxial with a second imaginary circle described by an outer periphery of the output discs, the first imaginary circle being greater than the second imaginary circle in diameter, wherein the splines are so arranged and constructed that tops of ridges of the splines are arranged on a third imaginary circle which is coaxial with the first imaginary circle and smaller than the same in diameter, and wherein any splines which would overlap with the threaded bolt holes when viewed from the open end of the transmission case are not provided.

DETAILED DESCRIPTION OF THE INVENTION

Figure 1:
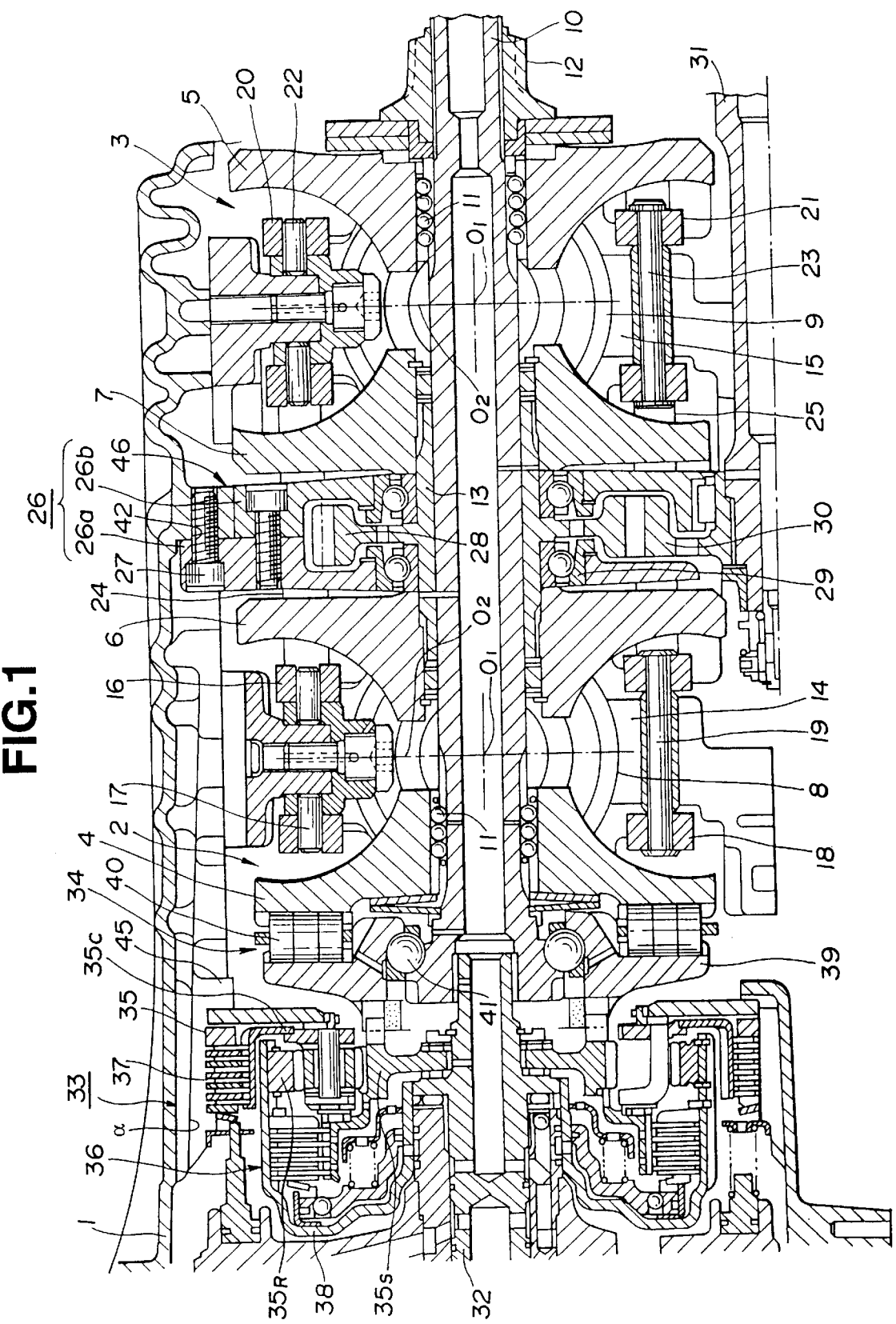
FIG. 1 is a vertically sectional view of a dual cavity toroidal type continuously variable transmission according to the present invention.

Referring to the drawings, particularly FIG. 1, there is shown a dual cavity toroidal type continuously variable transmission according to the present invention.

As shown in FIG. 1, the transmission of the invention has two, that is, front and rear toroidal type speed change units 2 and 3 which are coaxially installed in a transmission case 1. Each speed change unit 2 or 3 comprises an input cone disc 4 or 5, an output cone disc 6 or 7 and two power rollers 8 or 9 which are put between the input and output discs. As shown, the output disc 6 of the front speed change unit 2 and the output disc 7 of the rear speed change unit 3 are arranged back-to-back with each other. These two output discs 6 and 7 are the same in diameter.

For coaxially arranging the two speed change units 2 and 3, there is rotatably provided a main shaft 10 in the transmission case 1, which supports thereon the input and output discs 4 and 5, 6 and 7 of the two speed change units 2 and 3. Each input disc 4 or 5 rotates together with the main shaft 10. Due to provision of a so-called ball-spline structure 11, each input disc 4 or 5 is permitted to make an axial displacement relative to the main shaft 10. As shown, a stop nut 12 is fixed to the main shaft 10 to hold the input disc 5 of the rear speed change unit 3. The output discs 6 and 7 are united through a hollow output shaft 13 which is rotatably disposed about the main shaft 10. The paired power rollers 8 or 9 are put between the corresponding input and output discs 4 and 6 (or 5 and 7) in a manner to be compressed therebetween, so that a torque transmission from the input disc to the output disc through the power rollers is carried out. The power rollers 8 or 9 of each speed change unit 2 or 3 are rotatably supported on trunnions 14 or 15.

The trunnions 14 for the front speed change unit 2 have upper ends respectively connected to opposed ends of an upper link 16. With usage of a pin 17, the upper link 16 is supported on the transmission case 1 in such a manner that a middle portion of the upper link 16 is vertically pivotal. The trunnions 14 have lower ends respectively connected to opposed ends of a lower link 18. With usage of a pin 19, the lower link 18 is supported on the transmission case 1 in such a manner that a middle portion of the lower link 18 is vertically pivotal. With these arrangements, one unit including one trunnion 14 and its associated power roller 8 and the other unit including the other trunnion 14 and its associated power roller 8 are permitted to make synchronized but opposed strokes in a direction of a power roller swing axis "O2" which is perpendicular to a power roller rotation axis "O1".

Similar to the above-mentioned trunnions 14 for the front speed change unit 2, the trunnions 15 for the rear speed change unit 3 have upper ends respectively connected opposed ends of an upper link 20 and lower ends respectively connected opposed ends of a lower link 21. With usage of a pin 22 or 23, the upper or lower link 20 or 21 is supported on the transmission case 1 in such a manner that a middle portion of the upper or lower link 20 or 21 is vertically pivotal. With these arrangement, one unit including one trunnion 15 and its associated power roller 9 and the other unit including the other trunnion 15 and its associated power roller 9 are permitted to make synchronized but opposed strokes in a direction of a power roller switch axis "O2" which is perpendicular to a power roller rotation axis "O1".

The upper links 16 and 20 of the two speed change units 2 and 3 are connected through a bridging member 24, and the lower links 18 and 21 of the two speed change units 2 and 3 are connected through another bridging member 25. With these bridging mechanism, the trunnions 14 and the power rollers 8 for the front speed change unit 2 and the trunnions 15 and the power rollers 9 for the rear speed change unit 3 are synchronized in operation.

Between the output discs 6 and 7, there is arranged an output gear housing 26 which serves as an intermediate wall member. As shown, the output gear housing 26 generally consists of two half parts 26a and 26b which are united. The gear housing 26 is secured to the transmission case 1 by bolts 27 which have been inserted into the case 1 from a front (or left in the illustrated embodiment) open end of the case 1. Within the gear housing 26, there is rotatably disposed an output gear 28 which is integral with the hollow output shaft 13. Within the gear housing 26, there are also disposed two ball bearings 29 which rotatably support a middle portion of the main shaft 10 through the hollow output shaft 13. A counter gear 30 is meshed with the output gear 28 which is connected with a counter shaft 31. With this, the torque from the output discs 6 and 7 is transmitted to the counter shaft 31.

Designated by numeral 32 is an input shaft which is aligned with the main shaft 10. As shown, a rear end of the input shaft 32 is received in a bore formed in a front enlarged end of the main shaft 10 to effect a relative rotation therebetween.

Around the rear end of the input shaft 32, there is arranged a forward/backward switching mechanism 33 which can change the direction of rotation before transmitting the rotation of the input shaft 32 to a loading cam device 34 which is coaxially arranged between the forward/backward switching mechanism 33 and the input disc 4 of the front speed change unit 2.

The forward/backward switching mechanism 33 generally comprises a planetary gear unit 35, a forward (or connection) clutch 36 and a backward brake 37. A ring gear 35R of the planetary gear unit 35 is connected through a drum 38 to the input shaft 32 to constitute a rotatable input member. A sun gear 35S of the unit 35, which serves as a rotatable output member, is engaged with a cam flange 39 of the loading cam device 34 to rotate therewith. When the ring gear 35R and the sun gear 35S are united through the forward clutch 36, the switching mechanism 33 transmits the torque of the input shaft 32 to the cam flange 39 keeping direction of rotation thereby to move an associated motor vehicle in a forward direction. While, when a pinion carrier 35C of the unit 35 is fixed to the transmission case 1 through the backward brake 37, the switching mechanism 33 transmits the torque of the input shaft 32 to the cam flange 39 changing direction of rotation thereby to move the motor vehicle in a backward direction.

The cam flange 39 of the loading cam device 34 is arranged to coaxially face the input disc 4 of the front speed change unit 2. The cam flange 39 is disposed on the diametrically enlarged front portion of the main shaft 10 through a ball-thrust bearing 41. Between respective cam surfaces of the input disc 4 and the cam flange 39, there are operatively disposed cam rollers 40. Thus, a rotation transmitted to the cam flange 39 from the sun gear 35S is transmitted to the input disc 4 of the front speed change unit 2 and then through the main shaft 10 to the input disc 5 of the rear speed change unit 3. During this, due to relative rotation between the cam flange 39 and the input disc 4, a certain thrust according to a transmitted torque is applied to the input disc 4 to bias the same toward the output disc 6.

A reaction force of the thrust is transmitted through the cam flange 32, the radial-thrust bearing 41, the main shaft 10 and the stop nut 12 to the input disc 5 of the rear speed change unit 3 to bias the same toward the output disc 7. Thus, during operation of the transmission, the power rollers 8 or 9 are compressed between the input and output discs 4 and 6 (or, 5 and 7) with a force according to the transmitted torque, thereby establishing a torque transmission from the input disc to the output disc.

In accordance with the present invention, the following unique measure is employed.

As is easily understood from FIG. 1, the bolts 27 for connecting the gear housing 26 to the transmission case 1 are positioned radially outside of an outer periphery of each output disc 6 or 7. That is, threaded bolt holes 42 formed in inward projections 46 of the transmission case 1 are arranged on a first imaginary circle 47 which is coaxial with a second imaginary circle 48 described by the outer periphery of each output disc 6 or 7, and the first imaginary circle 47 is greater than the second imaginary circle 48 in diameter. Positions of the bolt holes 42 are clearly shown in FIGS. 2, 3 and 5.

As is seen from these drawings, the inward projections of the transmission case 1 has on the first imaginary circle as two blind holes 43 into which positioning pins (not shown) of the gear housing 26 are inserted.

Figure 3:
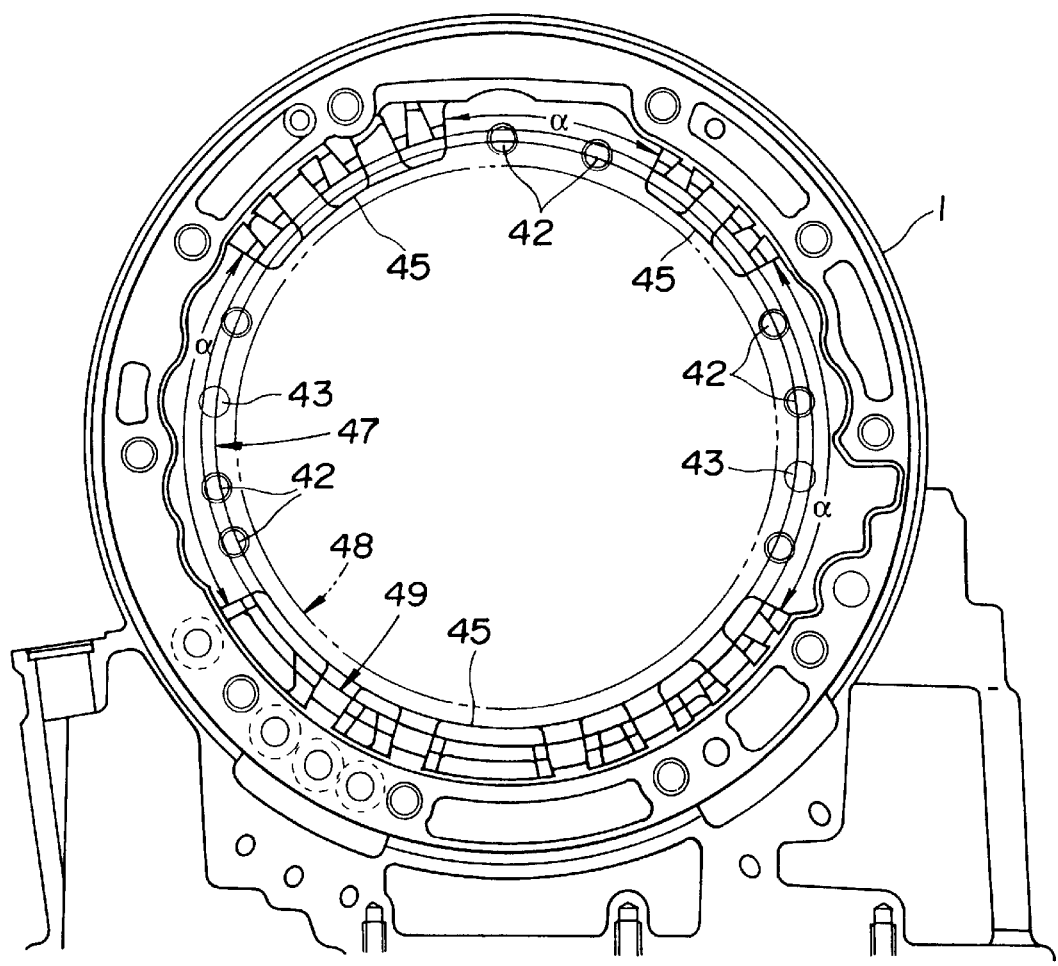
FIG. 3 is a sectional view taken along the line 3—3 of FIG. 2.
Figure 4:
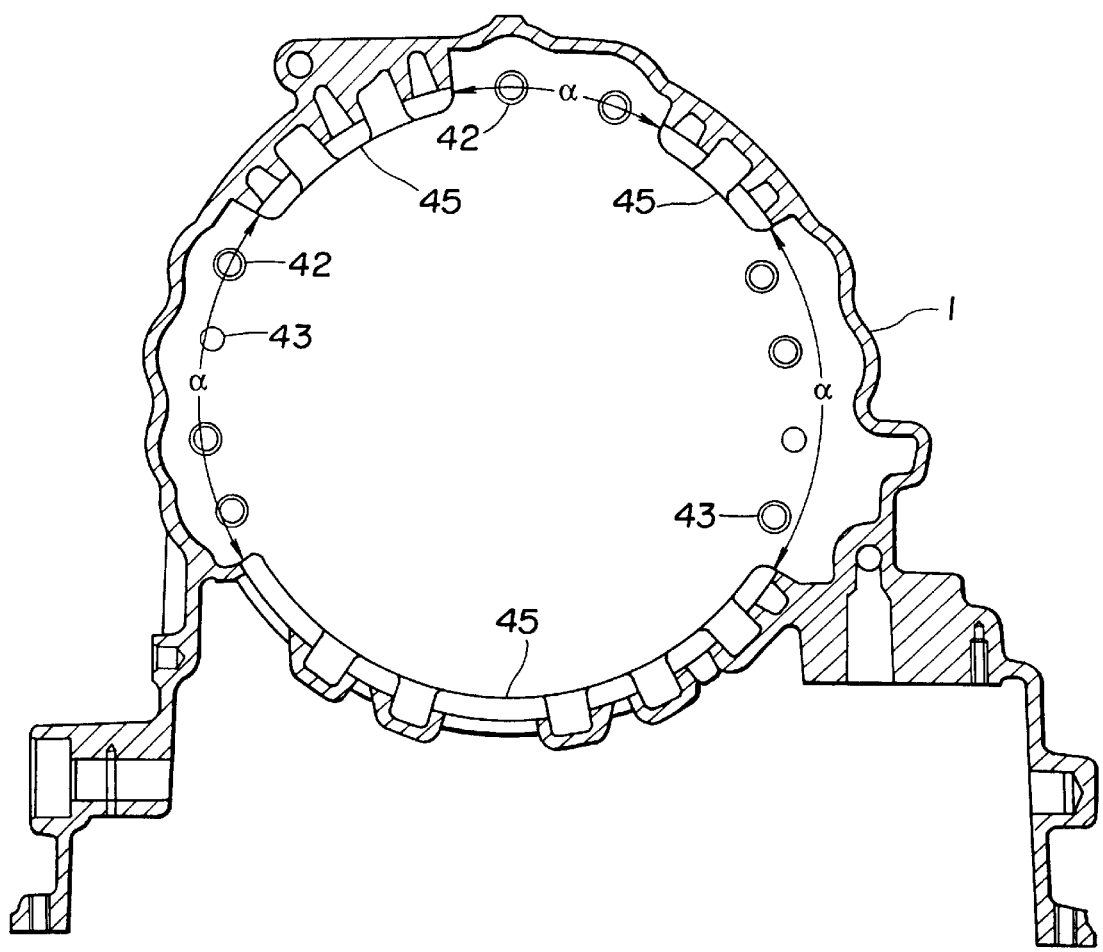
FIG. 4 is a sectional view taken along the line 4—4 of FIG. 2.
Figure 5:
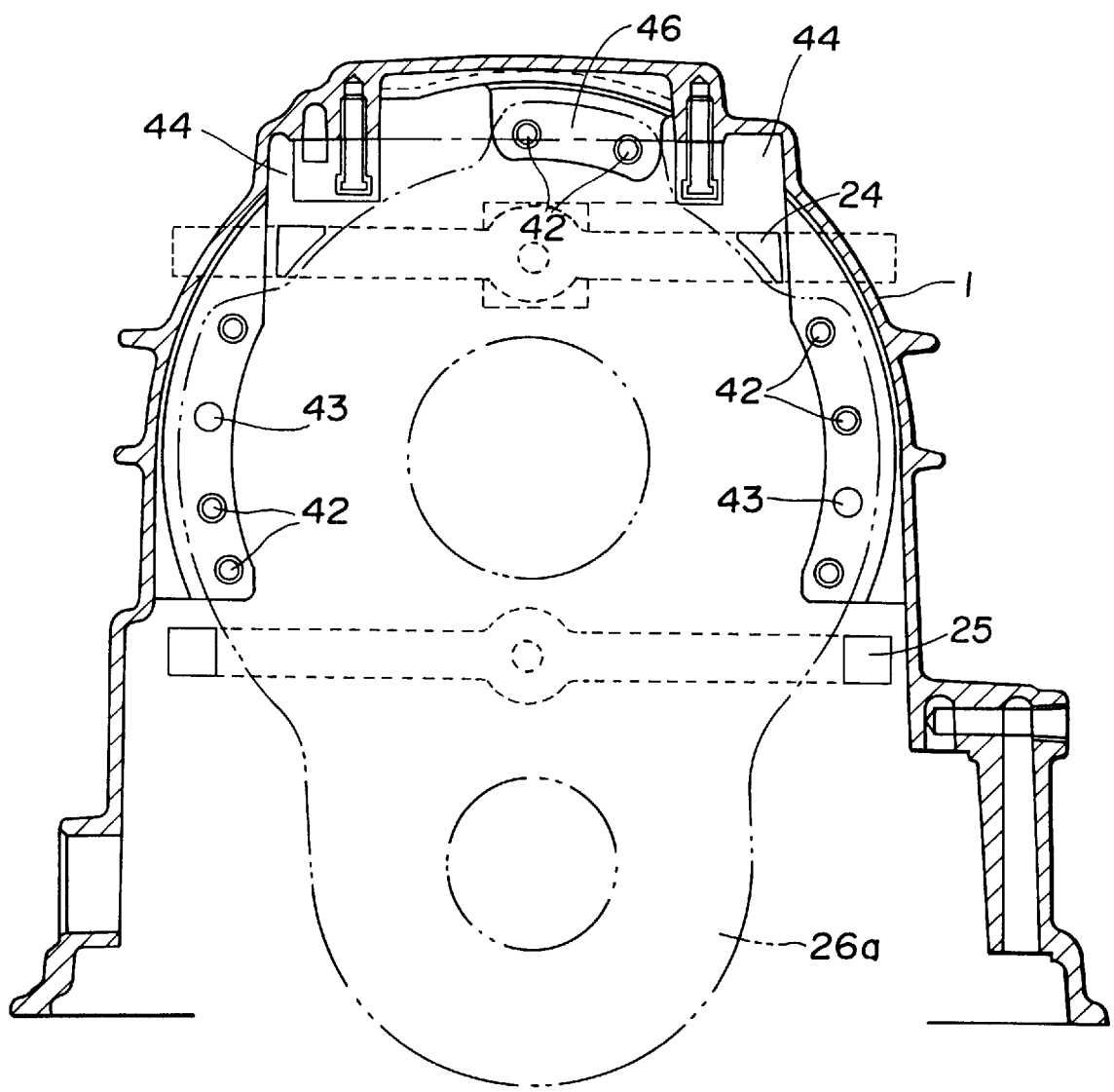
FIG. 5 is a sectional view taken along the line 5—5 of FIG. 2.

As is seen from FIGS. 3 and 5, the threaded bolt holes 42 are grouped into three, that is, one upper group and two side groups with respect to the transmission case 1. As is seen from FIG. 5, with this grouping, two certain spaces 44 can be defined, each being positioned between the upper group and one of the side groups.

As is understood from FIG. 1, the two bridging members 24 and 25 are passed through the spaces 44 respectively.

Figure 2:
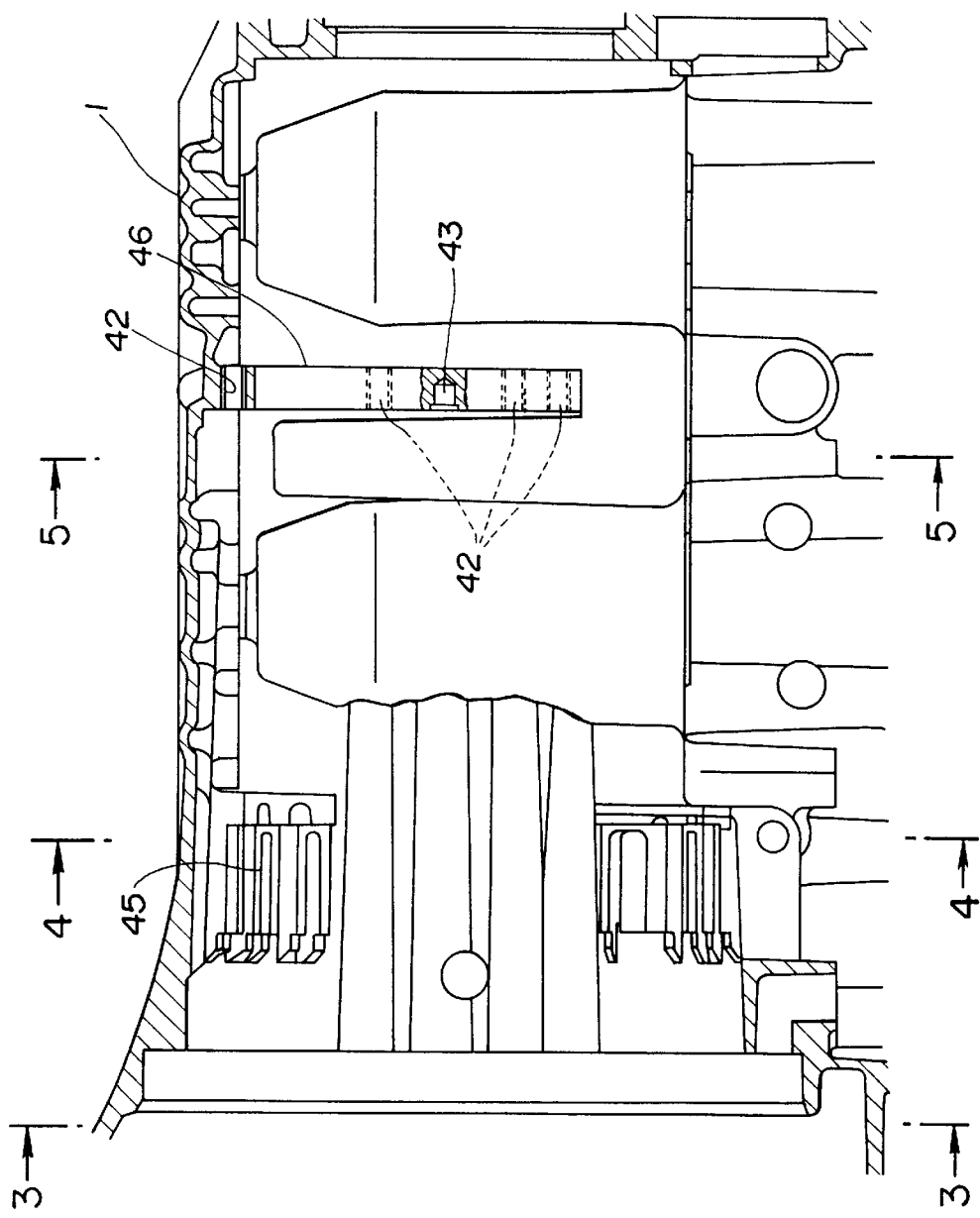
FIG. 2 is a vertically sectional view of a transmission case employed in the transmission of the present invention.

A is seen from FIGS. 1 and 2, the transmission case 1 has therein near the front open end thereof circularly arranged splines 45 along which driven plates of the backward brake 37 are axially moved while being suppressed from rotation.

In the present invention, the following unique measure is further employed in the structure of the circularly arranged splines 45.

That is, the splines 45 are so arranged and constructed that tops of ridges of the splines are arranged on a third imaginary circle 49 which is coaxial with the above-mentioned first imaginary circle 47 and smaller than the same in diameter.

As is seen from FIG. 3, any splines 45 which would be in areas "α" overlapping with the threaded bolt holes 42 when viewed from the left in the drawing are not provided. Of course, the areas "α" should be reduced in size as small as possible for obtaining a satisfied connection between the remaining splines 45 and the driven plates. The height of each spline should be increased for the satisfied connection. It is now to be noted that such satisfied connection between the splines 45 and the driven plates of the backward brake 37 is achieved without need of enlarging the front open end of the transmission case 1.

As is understood from FIGS. 3 and 5, for achieving a smoothed insertion into the transmission case 1, the output gear housing 26 (26a and 26b) has no portions which interfere with the splines 45.

In the following, operation of the transmission of the present invention will be described with reference to FIG. 1.

Rotation of the input shaft 32 is transmitted to the cam flange 39 through the forward/backward switching mechanism 33 and then to the input disc 4 of the front speed change unit 2 through the loading cam device 34. At the same time, the rotation is transmitted to the input disc 5 of the rear speed change unit 3 through the ball-spline structure 11 and the main shaft 10.

Rotation of the input discs 4 and 5 is transmitted to the power rollers 8 and 9 to rotate the same about the rotation axes "O1". Rotation of the power rollers 8 and 9 are then transmitted to the output discs 6 and 7 and then to the counter shaft 31 through the output gear 28 and the counter gear 30. Although not shown in the drawing, the torque of the counter shaft 31 is transmitted to drive wheels of an associated motor vehicle through a known mechanism.

When, under this condition, the power rollers 8 or 9 are shifted in such a manner that the rotation axis "O1" thereof is offset from a rotation axis of the input and output discs 4 and 6 (or, 5 and 7), each power roller 8 or 9 is forced to swing about the swing axis "O2" in a direction corresponding to the offset. With this, the positions where each power roller 8 or 9 contacts the input and output discs 4 and 6 (or, 5 and 7) are changed thereby continuously varying the speed change ratio, that is, the speed ratio between the input and output discs 4 and 6 (or, 5 and 7). Due to provision of the bridging members 24 and 25, the swing operation of the power rollers 8 and that of the power rollers 9 are synchronized. Accordingly, the speed change ratio between the input shaft 32 and the output shaft 13, that is, the speed change ratio of the transmission can be continuously varied.

During this power transmission, due to relative rotation between the cam flange 39 and the input disc 4, a certain thrust according to a transmitted torque is applied to the input disc 4 of the front speed change unit 2 to bias the same toward the output disc 6, and at the same time, a reaction force of the thrust is transmitted through the cam flange 32, the radial-thrust bearing 41, the main shaft 10 and the stop nut 12 to the input disc 5 of the rear speed change unit 3 to bias the same toward the output disc 7.

In the following, advantageous features possessed by the above-mentioned transmission of the present invention will be described.

First, as is described hereinabove, in the invention, the threaded bolt holes 42 for the bolts 27 are arranged on a first imaginary circle which is coaxial with a second imaginary circle described by the outer periphery of the output discs 6 and 7. That is, the bolt holes 42 are positioned radially outside of the outer periphery of the output discs 6 and 7. Accordingly, the advantage possessed by the transmission of the above-mentioned publication 7-158712 is also possessed by the present invention. That is, before inserting the gear housing 26 (or intermediate wall member) into the transmission case 1, almost all parts, such as the output discs 6 and 7, hollow output shaft 13, ball bearings 29 and output gear 28 are all preassembled to the gear housing 26, then the preassembled gear housing 26 is inserted into the transmission case, and then the gear housing 26 is secured to the inward projections of the transmission case 1 by the bolts 27. As is easily known, these assembling steps are very simple.

Second, the threaded bolt holes 42 are grouped into three as is mentioned hereinabove. With this grouping, the two spaces 44 for accommodating one of the bridging members 24 and 25 are easily provided around the gear housing 26.

Third, the splines 45 for the driven plates of the backward brake 37 have ridges whose tops are arranged on a third imaginary circle which is coaxial with the first imaginary circle and smaller than the same in diameter, and any splines 45 which would overlap with the threaded bolt holes 42 when viewed from the open end of the transmission case 1 are not provided. Accordingly, the work for manipulating the bolts 27 in the transmission case 1 is easily carried out with a simple tool and thus the work for bolting the gear housing 26 to the inward projections of the transmission case 1 is easily, quickly and assuredly carried out. Accordingly, irrespective of the radially outside positioning of the bolt holes 42, the backward brake 37 of the forward/backward switching mechanism 33 can be compactly set in the front open portion of the transmission case 1 without need of enlarging the transmission case 1.

What is claimed is:

1. A dual cavity toroidal type continuously variable transmission comprising:

a transmission case having an open end;

front and rear toroidal type speed change units coaxially installed in said transmission case with respective output discs arranged back-to-back with each other;

a forward/backward switching mechanism installed in said transmission case near said open end, said switching mechanism including a brake including driven plates which are axially movable along splines formed on an inner wall of said transmission case;

a loading cam device operatively arranged between said forward/backward switching mechanism and an input disc of the front toroidal type speed change unit to transmit torque from the switching mechanism to the input discs of the front and rear speed change units while biasing each input disc toward the corresponding output disc;

inward projections integral with said transmission case, said inward projections being positioned between the two output discs and formed with threaded bolt holes directed toward said open end; and a gear housing coaxially installed in said transmission case and secured to said inward projections by means of bolts screwed into said threaded bolt holes;

wherein said threaded bolt holes are arranged on a first imaginary circle which is coaxial with a second imaginary circle described by an outer periphery of the output discs, said first imaginary circle being greater than said second imaginary circle in diameter, and wherein said splines are so arranged and constructed that tops of ridges of the splines are arranged on a third imaginary circle which is coaxial with said first imaginary circle and smaller than the same in diameter, and wherein any splines which would overlap with the threaded bolt holes when viewed from the open end of the transmission case are not provided.

2. A dual cavity toroidal type continuously variable transmission as claimed in claim 1, in which said threaded bolt holes are grouped into three to facilitate formation of two spaces around the gear housing, through which respective bridging members pass to obtain synchronized swing operation between power rollers of the front speed change unit and those of the rear speed change unit.

3. A dual cavity toroidal type continuously variable transmission as claimed in claim 1, in which said output discs are the same in diameter.

* * * * *